United States Patent
Isebrand

(10) Patent No.: US 9,429,482 B2
(45) Date of Patent: Aug. 30, 2016

(54) TOTAL AIR TEMPERATURE PROBE WITH LOW FRONTAL PROJECTED AREA

(71) Applicant: Rosemount Aerospace Inc., Burnsville, MN (US)

(72) Inventor: Scott D. Isebrand, Minneapolis, MN (US)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 392 days.

(21) Appl. No.: 14/186,728

(22) Filed: Feb. 21, 2014

(65) Prior Publication Data

US 2015/0241286 A1    Aug. 27, 2015

(51) Int. Cl.
   *G01K 13/02*    (2006.01)

(52) U.S. Cl.
   CPC .................................. *G01K 13/028* (2013.01)

(58) Field of Classification Search
   CPC ................................................... G01K 13/028
   USPC ........................................................ 374/138
   See application file for complete search history.

(56) References Cited

U.S. PATENT DOCUMENTS

| | | | | |
|---|---|---|---|---|
| 2,970,475 | A * | 2/1961 | Werner | G01K 13/02 374/135 |
| 7,370,526 | B1 * | 5/2008 | Ice | G01K 13/02 374/135 |
| 2003/0051546 | A1 * | 3/2003 | Collot | G01K 13/02 73/170.02 |
| 2003/0058919 | A1 * | 3/2003 | Ice | G01K 13/028 374/138 |
| 2004/0177683 | A1 * | 9/2004 | Ice | G01K 13/028 73/170.02 |
| 2004/0237641 | A1 | 12/2004 | Hanson et al. | |
| 2005/0232331 | A1 * | 10/2005 | Severson | G01K 13/028 374/128 |
| 2005/0232332 | A1 * | 10/2005 | Hanson | G01K 13/028 374/141 |
| 2006/0056489 | A1 | 3/2006 | Bernard et al. | |
| 2007/0064766 | A1 * | 3/2007 | Benning | G01K 13/028 374/138 |
| 2009/0154522 | A1 * | 6/2009 | Kulczyk | G01K 13/028 374/138 |

FOREIGN PATENT DOCUMENTS

EP    EP 1 457 765 A1    9/2004

OTHER PUBLICATIONS

Application No. 15154698.3-1555; European Search Report dated Jun. 23, 2015; 7 pages.

* cited by examiner

*Primary Examiner* — Lisa Caputo
*Assistant Examiner* — Philip Cotey
(74) *Attorney, Agent, or Firm* — Snell & Wilmer LLP

(57) ABSTRACT

Deicing performance of a total air temperature (TAT) probe may be improved by reducing the size of a frontal projected area upstream of an inertial bend of the TAT probe. In accordance with various embodiments, a TAT probe may comprise an airflow inlet having a first surface substantially parallel to an incoming airflow, a primary airflow passage through the TAT probe from the airflow inlet to a primary airflow outlet, and a total air temperature sensor assembly disposed within a sensor flow passage. In various embodiments, the sensor flow passage may be oriented perpendicular to a mounting surface of the TAT probe. Further, the first surface may be perpendicular to the sensor flow passage. In various embodiments, the airflow inlet may have a second surface that is inclined relative to the first surface to help facilitate a desirable pressure gradient and boundary bleed passage function.

9 Claims, 5 Drawing Sheets

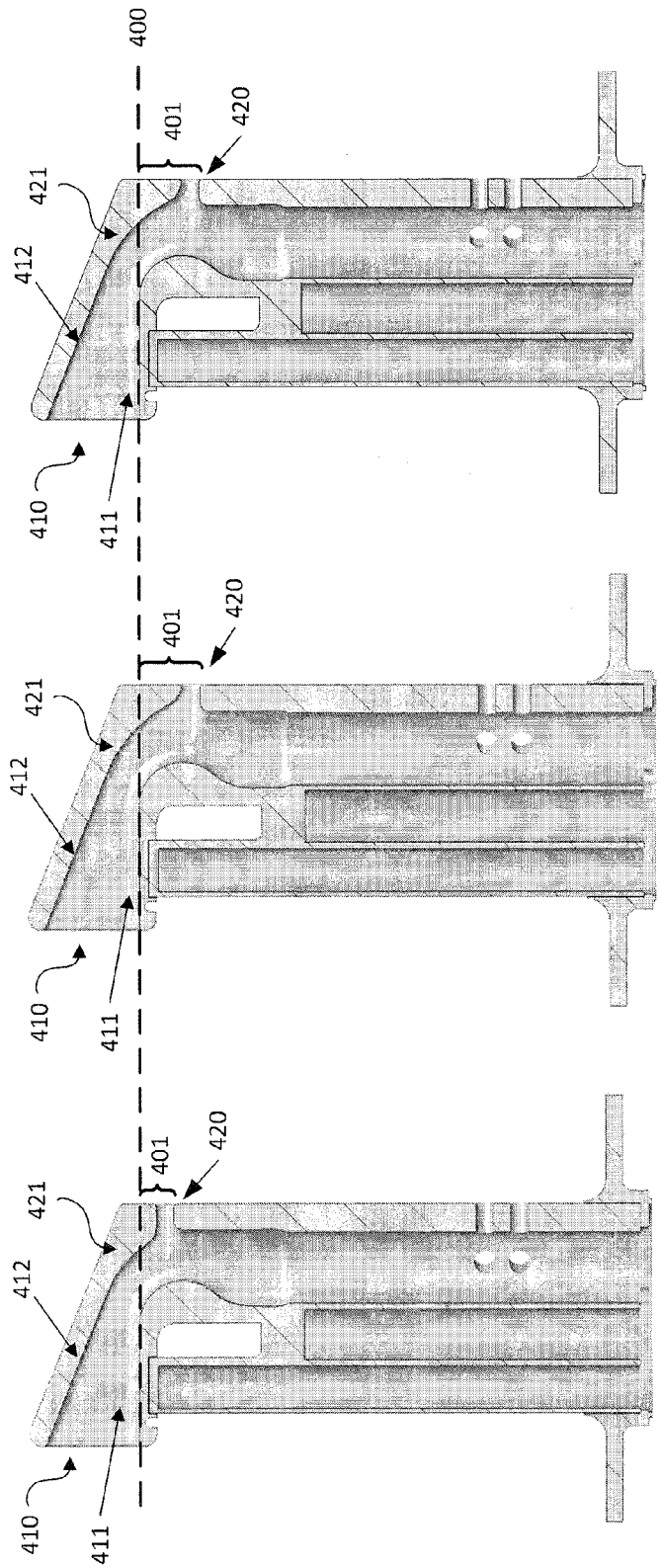

TOTAL AIR TEMPERATURE PROBE WITH LOW FRONTAL PROJECTED AREA

FIELD

The present disclosure relates to total air temperature probes, and more particularly, to reducing the frontal projected area of the total air temperature probe for improving performance in precipitation environments.

BACKGROUND

Conventional Total Air Temperature (TAT) probes, although often remarkably efficient as a TAT sensor, sometimes face the difficulty of working in icing conditions. During flight in icing conditions, water droplets, and/or ice crystals, are ingested into the TAT probe where, under moderate to severe conditions, they can accrete on the TAT probe surfaces. If operation in the severe weather persists, internal accretion may lead to congestion and clogging around the internal sensing element. Further, internal TAT congestion may lead to a temporary erroneous TAT reading. To address this problem, conventional TAT probes may be electrically heated and also incorporate an elbow, or bend, to inertially separate particles in airflow before reaching the sensing element. FIG. 1 illustrates a typical TAT probe design with an inclined surface upstream of the element passage commonly referred to as an air bump. The air bump aids inertial filtering and also provides a means of boundary layer bleed control. The air bump provides a significant projected area that will be exposed to particle impacts. Particle impacts on the heated air bump may produce surface liquid that may limit satisfactory performance in rain, ice and ice crystal environments.

Another phenomena which presents difficulties to some conventional TAT probe designs has to do with the problem of boundary layer separation, or "spillage", at low mass flows. Flow separation creates two problems for the accurate measurement of TAT. The first has to do with turbulence and the creation of irrecoverable losses that reduce the measured value of TAT. The second is tied to the necessity of having to heat the probe in order to prevent ice formation during icing conditions. Anti-icing performance is facilitated by heater elements embedded in the housing walls. Unfortunately, probe surface heating also heats the internal boundary layers of air which, if not properly controlled, provide an extraneous heat source in the measurement of TAT. This type of error, commonly referred to as DHE (Deicing Heater Error), may contribute to uncorrectable temperature error. The internal temperature element is typically thermally isolated from the main heated probe so that DHE is minimized. Under certain icing conditions internal accretion may form and grow on the thermally isolated temperature element. Rapid, and sometimes complete, blockage of the probe may occur, thereby leading to erroneous temperature measurements. Introduction of more severe aerospace icing requirements are increasingly problematic for conventional TAT probes.

SUMMARY

Deicing performance of a total air temperature (TAT) probe may be improved by reducing the size of a frontal projected area upstream of an inertial bend of the TAT probe. In accordance with various embodiments, a TAT probe may comprise an airflow inlet having a first surface substantially parallel to an incoming airflow, a primary airflow passage through the TAT probe from the airflow inlet to a primary airflow outlet, and a total air temperature sensor assembly disposed within a sensor flow passage. In various embodiments, the sensor flow passage may be oriented perpendicular to a mounting surface of the TAT probe. Further, the first surface may be perpendicular to the sensor flow passage. In various embodiments, the airflow inlet may have a second surface that is inclined relative to the first surface to help facilitate a desirable pressure gradient and boundary bleed passage function.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIGS. 4A-4C illustrate, in accordance with various embodiments, multiple variations of TAT probes with airflow outlets below airflow inlets.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, electrical, and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Modern jet powered aircraft require very accurate measurement of outside air temperature (OAT) for inputs to the air data computer, engine thrust management computer, and other airborne systems. For these aircraft types, their associated flight conditions, and the use of total air temperature probes in general, air temperature is better defined by the following four temperatures: (1) Static air temperature (SAT) or (Ts), (2) total air temperature (TAT) or (Tt), (3) recovery temperature (Tr), and (4) measured temperature (Tm). Static air temperature (SAT) or (Ts) is the temperature of the undisturbed air through which the aircraft is about to fly. Total air temperature (TAT) or (Tt) is the maximum air temperature that can be attained by 100% conversion of the kinetic energy of the flight. The measurement of TAT is derived from the recovery temperature (Tr), which is the adiabatic value of local air temperature on each portion of the aircraft surface due to incomplete recovery of the kinetic energy. Temperature (Tr) is in turn obtained from the measured temperature (Tm), which is the actual temperature as measured, and which differs from recovery temperature because of heat transfer effects due to imposed environments. For measuring the TAT, TAT probes may be used.

Figure 1:
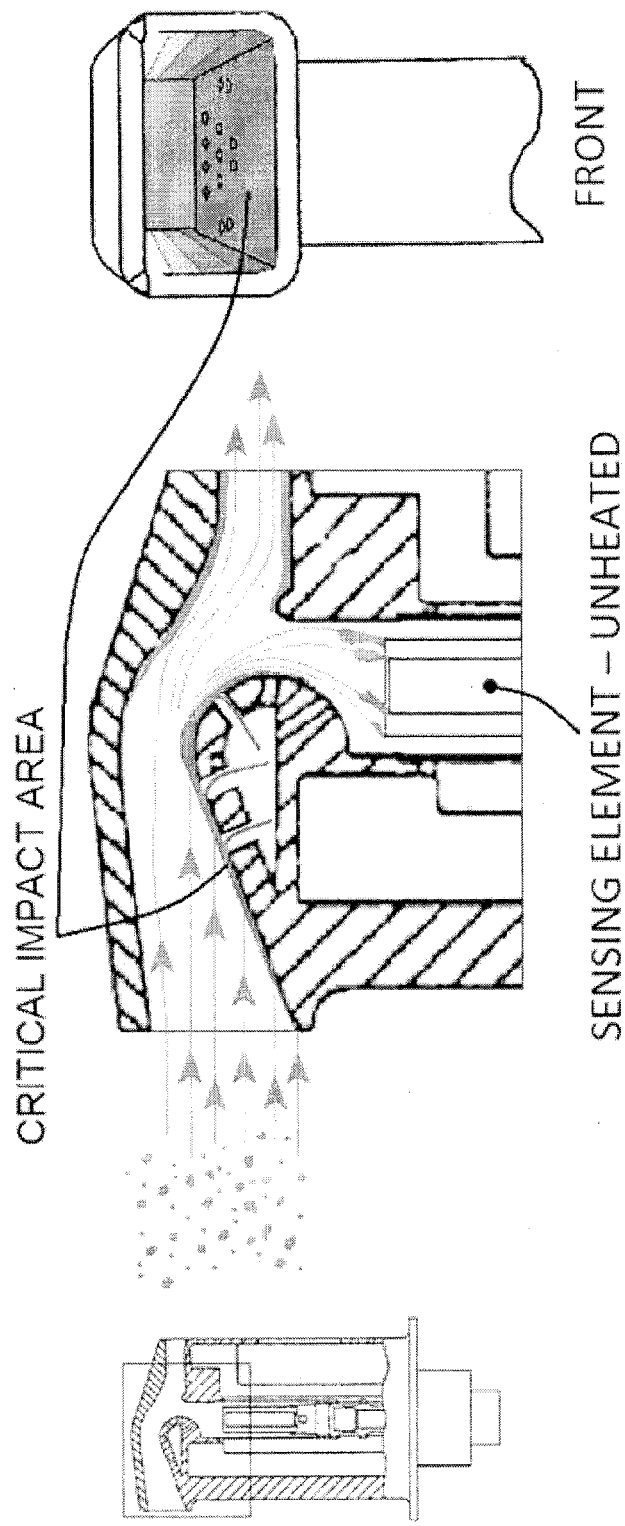
FIG. 1 illustrates a prior art embodiment of a TAT probe with inclined frontal projected area.
Figures 2A, 2B, 2C:
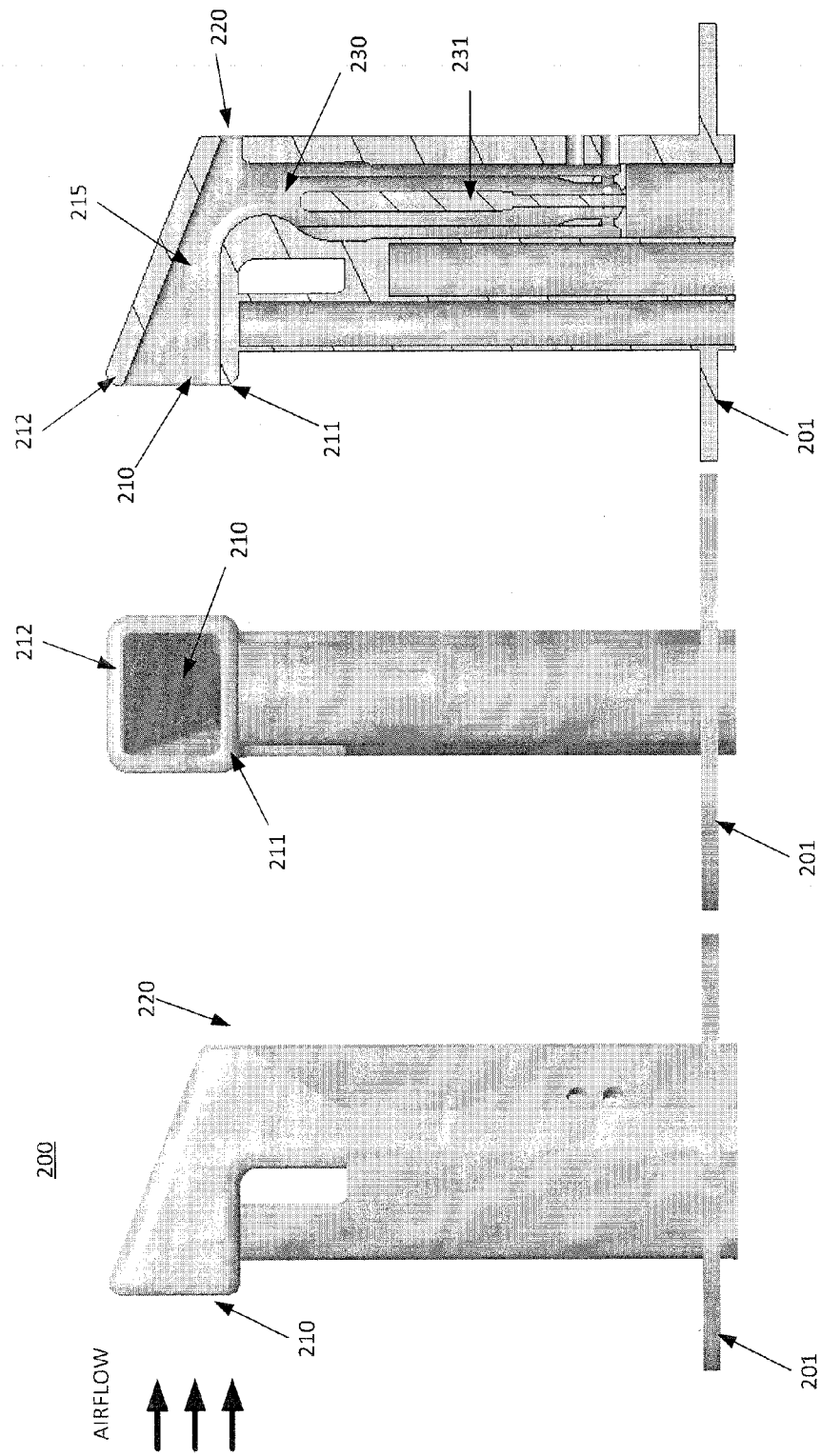
FIG. 2A illustrates, in accordance with various embodiments, a side view of a TAT probe.
FIG. 2B illustrates, in accordance with various embodiments, a front view of a TAT probe.
FIG. 2C illustrates, in accordance with various embodiments, a sectional view of a TAT probe.

FIGS. 2A-2C illustrate an exemplary total air temperature (TAT) probe in which a lower surface of an airflow inlet is substantially parallel to an airflow. In various embodiments, substantially parallel may include the lower surface of the airflow inlet being within 4° or less of parallel of the airflow. In other various embodiments, substantially parallel may include the lower surface of the airflow inlet being within 2° or less of parallel of the airflow. In addition, the lower surface of the airflow inlet could be below parallel to the airflow, such as −10° or less of parallel. In various embodiments, a TAT probe 200 comprises an airflow inlet 210 having a first surface 211 substantially parallel to an incoming airflow, a primary airflow passage 215 through the TAT probe 200 from the airflow inlet 210 to a primary airflow outlet 220, a sensor flow passage 230 in fluid communication with the primary airflow passage 215 and oriented perpendicular to a mounting surface 201 of the TAT probe 200. A TAT sensor assembly 231 may be disposed within the sensor flow passage 230. Furthermore, the first surface 211 may be perpendicular to the sensor flow passage 230.

In various embodiments, the first surface 211 may be adjacent to the sensor flow passage 230 and transitions between the airflow inlet and the sensor passage in an arcing manner. In addition, wherein the airflow inlet 210 has a second surface 212 that may be inclined relative to the first surface 211. The first surface 211 and the second surface 212 of the airflow inlet 210 may be converging towards the primary airflow outlet 220. Moreover, in various embodiments, the first surface 211 of the airflow inlet 210 may be heated. Any precipitation or icing present on the first surface 211 may be heated into surface liquid and then directed away from the sensor assembly through bleed vents.

Figure 3:
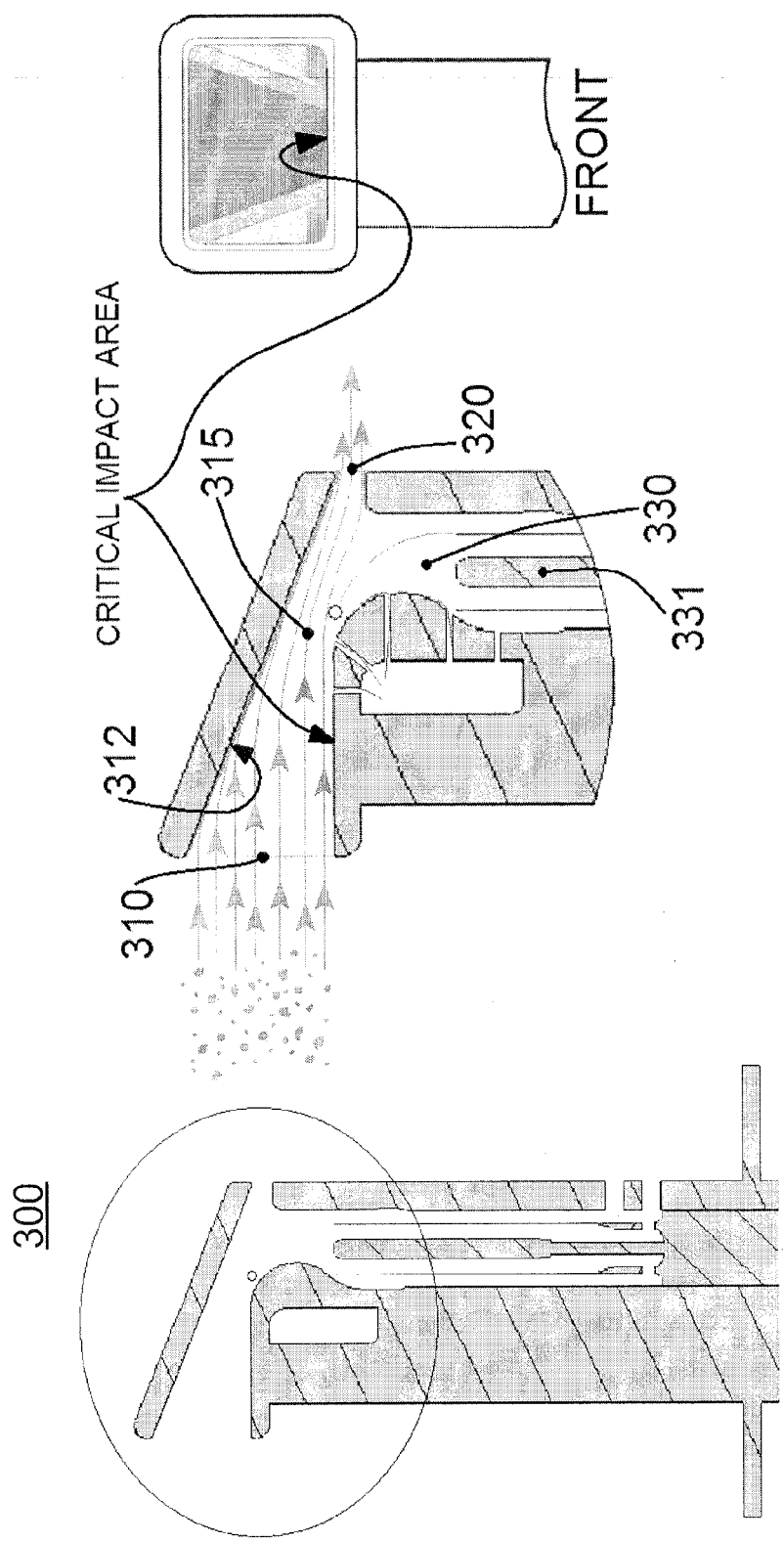
FIG. 3 illustrates, in accordance with various embodiments, a sectional view and front view of a TAT probe with illustrated airflow.

FIG. 3 illustrates a sectional view of a TAT probe 300 and the airflow and particle flow into a primary airflow inlet 310. A portion of the flow exits through a primary airflow outlet 320. However, some airflow is diverted down a sensor flow passage 330, where a TAT sensor assembly 331 measures the temperature. FIG. 3 also illustrates how particles, such as rain and ice crystals, flowing through the primary airflow inlet 310 impacts the upper surface 312 and exit through the primary airflow outlet 320. Furthermore, FIG. 3 also illustrates how particles may flow substantially parallel to the lower surface when flowing through the TAT probe 300. In accordance with various embodiments, particle impacts on the lower surface may be minimal and generate less liquid being present on the lower surface.

FIGS. 4A-4C illustrate various embodiments of TAT probes designed such that a primary airflow outlet 420 is below a plane 400 of the first surface 411 of the airflow inlet 410, creating an offset 401. In various embodiments, an offset may result in less particles flowing into a sensor flow passage. Furthermore, TAT probes having larger offset heights may be designed with additional curvature at the aft 421 of a second surface 412.

Figure 5B:
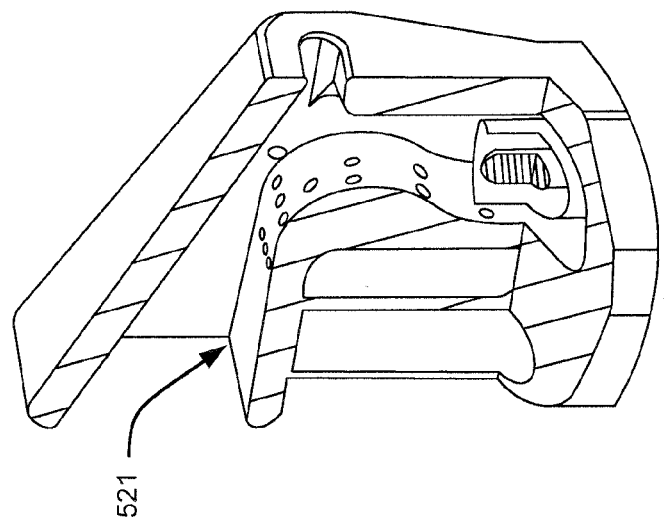
FIGS. 5A-5B illustrate, in accordance with various embodiments, various exemplary TAT probes with corner bleed vents and have various corner radii.
Figure 5A:
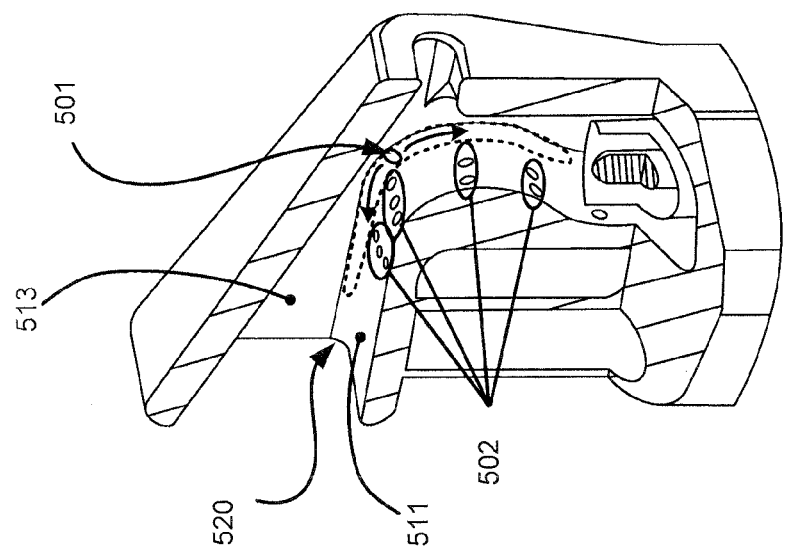

As briefly mentioned above, bleed vents may be used to divert surface liquid away from the impact area of the airflow inlet. In various embodiments and with reference to FIG. 5A, a TAT probe may further comprise corner bleed vents 501 at the corner of the first surface 511 of the airflow inlet in addition to surface bleed vents 502. Surface bleed vents 502 may be located on an interior portion of the first surface 511. A corner may be defined as the transition between the first surface 511 to a vertical surface 513. In various embodiments, the transition may be different radii 520, 521, depending on the TAT probe design and as illustrated in FIGS. 5A and 5B. An exemplary radius may range between a 0 inch (0 cm) radius to a 0.25 inch (0.635 cm) radius. In various embodiments, the bleed vents may be located at a transition area between the first surface and the sensor flow passage.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A total air temperature (TAT) probe comprising:
    a mounting surface extending in a longitudinal direction from a forward end to an aft end of the TAT probe;
    a primary airflow passage through the TAT probe;
    a primary airflow outlet defining an outlet to the primary airflow passage;
    a sensor flow passage in fluid communication with the primary airflow passage;
    an airflow inlet defining an inlet to the primary airflow passage and having a first surface extending in a direction that is within four degrees of a direction of an airflow received by the airflow inlet and within four degrees of the longitudinal direction of the mounting surface and a second surface inclined relative to the first surface such that the first surface and the second surface converge from the airflow inlet towards sensor flow passage; and
    a total air temperature sensor assembly disposed within the sensor flow passage,
    wherein the first surface is positioned nearer to the mounting surface than the second surface.

2. The TAT probe of claim 1, wherein the first surface is adjacent to the sensor flow passage.

3. The TAT probe of claim 1, wherein the sensor flow passage is oriented perpendicular to the mounting surface of the TAT probe.

4. The TAT probe of claim 1, wherein the first surface is perpendicular to the sensor flow passage.

5. The TAT probe of claim 1, wherein the primary airflow outlet is below a plane of the first surface of the airflow inlet.

6. The TAT probe of claim 1, further comprising at least one bleed vent at a corner of the first surface and a vertical surface of the airflow inlet.

7. The TAT probe of claim 6, wherein the at least one bleed vent is located at a transition area between the first surface and the sensor flow passage.

8. The TAT probe of claim 6, further comprising additional surface bleed vents on an interior portion of the first surface of the airflow inlet.

9. A total air temperature (TAT) probe comprising:
    a mounting surface;
    a primary airflow passage through the TAT probe;
    a sensor flow passage in fluid communication with the primary airflow passage;
    an airflow inlet having a first surface extending in a direction that is within four degrees of a direction of an airflow received by the airflow inlet and within four degrees of the longitudinal direction of the mounting surface, a second surface that converges towards the first surface from the airflow inlet towards the sensor flow passage, and at least one vertical surface that together with the first surface and the second surface define the airflow inlet;
    at least one bleed vent at a corner of the first surface and one of the at least one vertical surfaces of the airflow inlet; and
    a total air temperature sensor assembly disposed within a sensor flow passage, wherein the sensor flow passage is connected to the primary airflow passage.

* * * * *